(12) United States Patent
Curfew

(10) Patent No.: US 10,403,947 B1
(45) Date of Patent: Sep. 3, 2019

(54) METALLIC ELECTROCHEMICAL CELLS AND METHODS FOR PRODUCING ON-DEMAND ELECTRICITY

(71) Applicant: Dan Curfew, Laramie, WY (US)

(72) Inventor: Dan Curfew, Laramie, WY (US)

(*) Notice: Subject to any disclaimer, the term of this patent is extended or adjusted under 35 U.S.C. 154(b) by 591 days.

(21) Appl. No.: 14/716,683

(22) Filed: May 19, 2015

Related U.S. Application Data

(60) Provisional application No. 62/000,410, filed on May 19, 2014.

(51) Int. Cl.
*H01M 10/0564* (2010.01)
*H01M 6/32* (2006.01)
*H01M 6/16* (2006.01)
*H01M 12/06* (2006.01)

(52) U.S. Cl.
CPC ............ *H01M 12/065* (2013.01); *H01M 6/32* (2013.01); *H01M 2300/0028* (2013.01)

(58) Field of Classification Search
CPC ............... H01M 12/08; H01M 12/065; H01M 2300/0028; H01M 2300/0037; H01M 2300/004; H01M 2300/0042; H01M 10/0564; H01M 10/0567; H01M 10/0568
See application file for complete search history.

(56) References Cited

U.S. PATENT DOCUMENTS

| | | | | |
|---|---|---|---|---|
| 3,536,536 A * | 10/1970 | Lucas | ...................... | H01M 6/38 429/116 |
| 4,842,963 A * | 6/1989 | Ross, Jr. | ................ | H01M 4/244 29/623.1 |
| 5,445,901 A * | 8/1995 | Korall | ...................... | H01M 2/20 429/118 |
| 7,247,254 B1 * | 7/2007 | Flowers | .................... | C09K 5/20 252/70 |
| 2002/0132158 A1 * | 9/2002 | Sassen | ................ | H01M 2/1094 429/406 |

(Continued)

*Primary Examiner* — Ula C Ruddock
*Assistant Examiner* — Matthew W Van Oudenaren
(74) *Attorney, Agent, or Firm* — Fennemore Craig, P.C.

(57) ABSTRACT

A method and system is provided for producing direct current electricity from electrochemical oxidation of one of at least magnesium, zinc, or aluminum metal by at least one of water and oxygen to produce at least one of magnesium hydroxide, zinc hydroxide, or aluminum hydroxide. The design of dry-cells for the same using relatively light weight materials provides a transportable, infinite energy supply system that is activated with the addition of at least one of an aqueous solvent or a polar solvent to produce an electrolyte solution. Methods, systems, and apparatuses for the same are provided for introducing electrolyte solutions and changing solid plates comprised of at least one of magnesium, zinc, or aluminum—also referred to as fuel cards—to initiate or sustain electricity generation. Methods, systems, and apparatuses are provided for the same that accelerate electricity generation by the introduction of one of at least air or oxygen. Methods, systems, and apparatuses for the same are provided that reduce electricity generation by introduction of at least one of an inert gas such as nitrogen or by separating the electrolyte solution from the reaction cell. Systems, methods, and apparatuses for the same are provided.

24 Claims, 3 Drawing Sheets

(56) References Cited

U.S. PATENT DOCUMENTS

| | | | | |
|---|---|---|---|---|
| 2004/0005488 | A1* | 1/2004 | Faris | H01M 10/42 |
| | | | | 429/404 |
| 2007/0141462 | A1* | 6/2007 | Wang | H01M 6/04 |
| | | | | 429/206 |
| 2007/0298305 | A1* | 12/2007 | Van Burdine | B60L 11/1822 |
| | | | | 429/451 |
| 2012/0021303 | A1* | 1/2012 | Amendola | H01M 4/42 |
| | | | | 429/406 |
| 2013/0052547 | A1* | 2/2013 | Ogino | H01M 4/96 |
| | | | | 429/406 |
| 2013/0065143 | A1* | 3/2013 | Knepple | C01B 3/32 |
| | | | | 429/423 |

\* cited by examiner

METALLIC ELECTROCHEMICAL CELLS AND METHODS FOR PRODUCING ON-DEMAND ELECTRICITY

CROSS-REFERENCE TO RELATED APPLICATIONS

This application claims the benefit of priority of U.S. Provisional Application No. 62/000,410 filed May 19, 2014, the disclosure of which is incorporated herein by reference in its entirety.

BACKGROUND

Technical Field

Batteries offer a form of electrical power storage that can be practically deployed on a small scale to power electronic equipment and to provide illumination, on an intermediate scale to provide resistance or inductive heating, and on a large scale to supply short-term electricity supply. Electrochemical batteries are generally classified into two categories, wet half-cell reactions or dry-half cell reactions. The present technology reports to the field of wet half cells. Wet cell batteries operate with the presence of either a polar solvent or a nonpolar solvent. These solvents may be aqueous or non-aqueous. In a preferred sense, the present technology applies to aqueous/polar solvents. Electrochemical batteries may utilize physical systems and methods in the fields of membranes, coatings, electricity, and electrical conductors.

Description of the Related Art

A wet electrochemical cell is a battery using materials, physics, and chemistry that differ from those applied to dry cell batteries. In redox systems, the available quantity of reactants to be oxidized and reduced determines the total capacity in ampere-hours.

SUMMARY

The basis of this disclosure centers upon a wet electrochemical cell that uses one of either magnesium, zinc, or aluminum-based fuel cards to drive the half-cell reactions at the anode of the battery, and water for the half-cell reaction at the cathode. Application of air to the cathode provides an accelerant by introducing a second reaction at the cathode. Application of oxygen-enriched air or pure oxygen to the cathode greatly enhances and accelerates the reactions at the cathode as a function of the concentration of oxygen in the gas.

In one embodiment, a battery half cell includes a housing with an inlet for providing an oxygen source. A cathode is carbon-based, and there is a metal anode selected from the group consisting of magnesium, zinc, aluminum and combinations of these metals. An electrolyte layer provides a pathway to place the carbon-based cathode in fluidic communication with the metal anode.

In one aspect, the carbon-based cathode may be graphene. interposed between the electrolyte layer and the metal anode.

In one aspect, the electrolyte layer may be provided with a liquid electrolyte material to provide electricity on demand. The electrolyte material is preferably an alcohol or a polyol such as a glycol mixed with water. A hydroxyl base, such as a metal hydroxide, may be added to the liquid electrolyte material.

In one aspect, the metal anode may be provided as a plurality of fuel card stacks, for example, as metal plates or rods. The battery half cell is then recharged by replacing the fuel card stacks.

A system as described may be designed to provide a wide range of voltage and power. Voltages may be adjusted, for example, by wiring the battery half cells in series. The battery half cells may be quite large, for example providing electrical power in a range from 100 kW-hr to 10 MW-hr, or quite small, producing current in the mA range. Thus, for example, a system may be used to provide backup power for a wind-farm that generates electricity using wind turbines. The metal anodes may be lifted from an electrolyte solution to stop the electrochemical reaction when the wind is blowing, and immersed into the electrolyte when the wind stops blowing. Exhausted fuel stacks may be replenished and recycled.

In one aspect, the electrolyte layer may be mixed with chemical powders and left in a dry state that is state made ready for emergency use upon addition of liquid electrolyte material. This type of system is useful in a method for producing on-demand high performance direct current by adding liquid electrolyte material to the electrolyte layer to initiate the electrochemical reactions.

Use of an absorbent pad in the electrolyte layer optionally disperses the electrolyte solution for provision of the electrochemical reactions. A drain connected to the electrolyte layer provides means for removing the electrolyte solution from the fuel card stacks for selective control of the electrochemical reactions Alternatively, the metal anode(s) may be raised for removal from the electrolyte solution.

In one aspect, a gas pump or pressurized canister is configured to supply oxygen through the inlet to facilitate the electrochemical reactions.

The methods, systems, and apparatus of this invention provide a light-weight, transportable battery that has an indefinite shelf life until put into service, and which can be assembled in a variety of configurations that provide flexibility in voltage and amperage output and duration of operation. These features may therefore be applied to a wide variety of embodiments and fields of use.

This primary flexibility of this invention is light-weight fuel cards that may be installed and activated by the introduction of aqueous solvents and throttled by removal of with the solvents, as well as the fuel cards. Spent fuels cards and solvents can be removed and discarded as non-toxic wastes.

The reactions can be accelerated with the injection of air, or oxygen-enriched air. The reactors can be throttles by the introduction of inert gases such as nitrogen.

The fundamental battery pack can be arranged in series of parallel configurations to dispatch direct current electricity at voltages ranging from 1-50 volts and amperage ranging from X to Y. The fuel cards can be designed to provide up to Z Watts.

Envisioned practical and commercial embodiments include: (1) a direct current supply for field operation of electronic equipment where photo-voltaic charging in impractical; (2) a power supply pack to recharge a primary battery used for electronic equipment; (3) a power supply for heating and illumination in the field; (4) a stored emergency power supply for life-support systems; (5) space battery applications.

DETAILED DESCRIPTION

Figure 1:
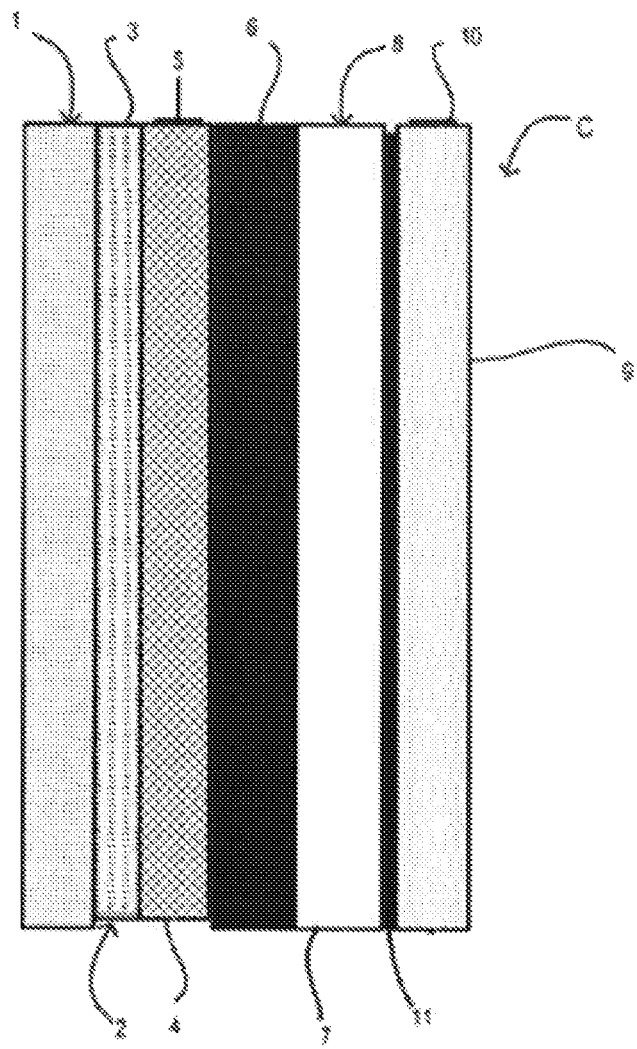
FIG. 1 shows a fundamental configuration of a half-cell reactor according to one embodiment.

FIG. 1 shows a fundamental unit or half cell C of this technology including a fuel card stack that may be replicated and connected in series with other such units to increase current and voltage or in parallel to increase current. A source 1 of at least one of air, oxygen-enriched air, or pure oxygen is supplied to facilitate the half cell reaction through a membrane 2 that may be perforated 3 to uniformly diffuse oxidizing gas to the half cell reaction. The membrane 2 may be, for example, made of a natural fiber fabric such as canvas, synthetic fiber, plastic or another synthetic resin that is perforated to make it permeable, such as perforated styrene, This membrane 2 contacts a highly conductive mesh or screen 4 that is bonded to a positive electrical conducting connector or post 5. The mesh 4 may be made of, for example, copper or aluminum. The mesh 4 is bonded to a carbon base 6 that effectively separates the mesh from the electrolyte solution and which distributes the cathodic charge to the mesh. The carbon base 6 may be suitably made of charcoal, graphite, graphene compressed onto the mesh 4 and functions as a cathode. An electrolyte layer 7 may be produced by saturating a pad with a pre-mixed electrolyte solution 8, or the electrolyte material may be provided as a crystalline powder that can be hydrated with an aqueous solution including, for example, either potable or waste water. The electrolyte material for this solution may be, for example, a polar solvent where glycols are preferred and propylene glycol is particularly preferred. Alternatively, an alcohol may be used, preferably one having a boiling point of about 130° F. or greater. These solvents are preferably mixed with water, and the water is optionally supplemented with a hydroxyl base, such as sodium hydroxide or potassium hydroxide to facilitate the reaction.

The electrolyte solution 8 contacts a metal plate 9 that functions as an anode and is preferably fabricated of at least one of lightweight magnesium, aluminum, or zinc. These metals may be used individually, combined as an alloy, or provided in separate layers. The half cell is connected to a negative electrical conducting connector or post 10, which may be made of a conductive metal, such as copper or aluminum A nano-coating to 11 is applied to disperse the contact of the electrolyte solution with the fuel card to ensure uniform half-cell reaction of the electrolyte solution with the same. The nano-coating 11 may be, for example, graphene.

Figure 2:
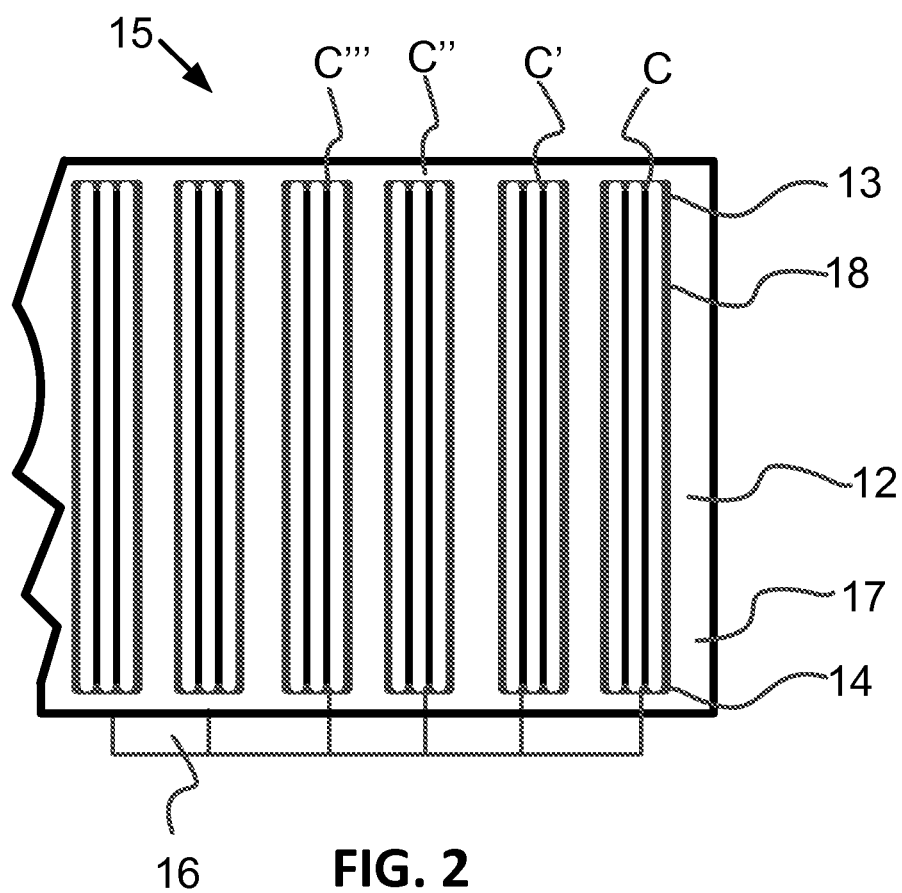
FIG. 2 shows a battery incorporating the fundamental structure according to FIG. 1.

The half cell C, as described above, may be provided in repeating or stacked units C, C', C", C''' to form a fuel card 12 as shown in FIG. 2. These half cells may be evenly spaced in a framework that is designed to insert and fix the half cells using an attachment (13 and 14) that provide a seal that isolates the repetitive cells. The posts 5, 10 (shown in FIG. 1) may be wired in parallel or serial connection of the cells as needed to upgrade voltage (in series) or amperage (in parallel) output meeting the expected demand in any particular environment of use. At least one of air, oxygen-enriched air, pure oxygen, or nitrogen is provided through a manifold of tubing to each of the repetitive cells within housing 15. At least one of water or an pre-mixed electrolyte solution is provided to the repetitive fuel cards through a manifold 16 of tubing to provide electrolyte solution 8 to electrolyte layer 7 (shown in FIG. 1). A similar manifold (not shown) may be used as the source 1 shown in FIG. 1 to supply oxygen or other gas to membrane 2. Each of the fuel card stacks C, C", C''' is connected to the positive 17 or negative 18 common posts in accordance with embodiment requirements. Each embodiment may be expanded to accommodate any number of fuel cards in accordance with the intended environment of use requirements.

Figure 3:
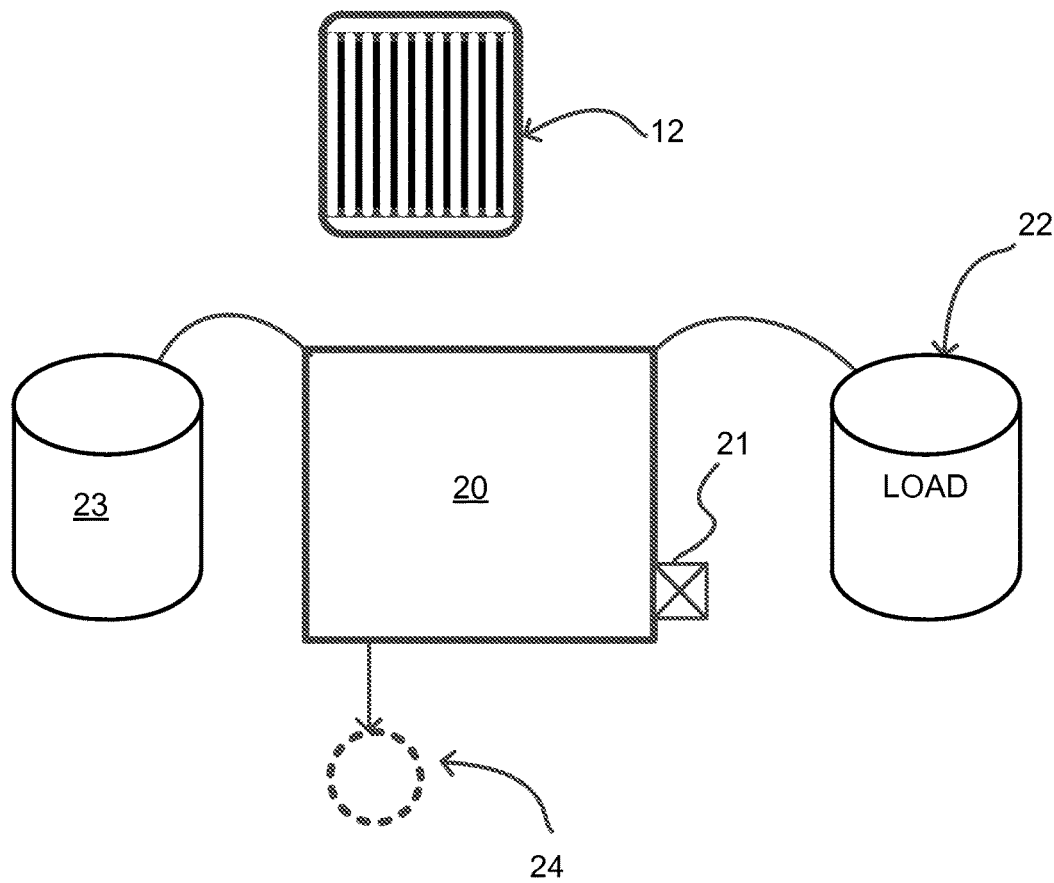
FIG. 3 shows a system that provides generalized flexibility of operational control in use of the battery according to FIG. 2.

As shown in FIG. 3, a power unit assembly 20 operates upon installation of the fuel card stacks 21, which can be replaced as needed to sustain electricity generation. The unit assembly may be activated to provide poser to load 22 by introduction of water or a pre-mixed electrolyte solutions 8 to layer 7 (See FIG. 1). The electrolyte solution may also be removed through drain 21 and re-supplied on demand to start and shut-down the electrochemical reactions. Oxidizing gases 23, such as oxygen, may provide the source 1 (see FIG. 1), for example, using a non-naturally occurring oxygen source such as an air pump, oxygen concentrator, or pressurized cylinder. An oxygen canister, or generator may be used to maximize the output voltage or amperage. Off-gas may be purged from the cell using a pump or sweep gas discharge (24).

The use of highly reactive magnesium (or zinc or aluminum) allows a higher voltage to be generated in a single cell. With dry magnesium metal (or aluminum) being light weight and with oxygen obtained from the atmosphere when needed, a transportable wet cell battery can be fabricated of materials that are held in a dry state until prepared for service by adding water. Pure water is preferred, but is not required, as the wet cell batteries can be practically operated at less than optimum output with water that is contaminated with organic or non-organic sediments or dissolved salts.

A battery configuration that allows the reactors to be replenished when depleted, and with methods for removing by-products, provides a technology that is reliable when service is needed and sustainable to the degree that reactants are accessible.

Applications of this subject invention cell are applicable to situations where high performance, low weight, batteries are required. This may include back-up electricity generation anywhere on-demand electrical power is required. This may include remote field use, emergency power backup, uninterrupted power back-up supply, and niche markets uses.

The electrochemical reactions of interest to this invention are listed in the table below for a wet-cell battery based on the application of magnesium as the fuel. Other metals that may be used include zinc and aluminum, but the illustrative example is given here for magnesium. Positive values of $E°$ indicate a reaction that will spontaneously occur in the direction written; negative values imply a spontaneous reverse reaction. Generically the system is a metal-air cell, a class of cells that has received much research attention over the last decade. Such cells have been based on Li, Na, Zn, and Mg. Some of their common problems include delivering oxygen to the active surface, controlling surface contamination, dealing with solids buildup, and limiting side reactions.

| | Electrochemical reaction | $E^0$, potential in volts at standard conditions | Note |
|---|---|---|---|
| A | $Mg^0 \rightarrow Mg^{2+} + 2\ e$ | 2.372* | Half cell reaction-anode |
| B | $C_3H_8O_2 + \frac{1}{2} O_2 + 2\ e \rightarrow 2\ OH$ | 0.401* | Half cell reaction-cathode |
| C | $2\ C_3H_8O_2 + 2\ e \rightarrow H_2 + 2\ OH$ | −0.828* | Half cell reaction-cathode |
| D | $Mg^{2+} + 2\ OH \rightarrow Mg(OH)_{2(s)}$ | 0.333 | Precipitation in electrolyte |
| E | $Mg^0 + C_3H_8\ O2 \rightarrow Mg(OH)_{2(s)}$ | 3.106 | Sum of A, B, D |
| F | $Mg^0 + C_3H_8\ O2 \rightarrow Mg(OH)_{2(s)} + H_2$ | 1.877 | Sum of A, C, D |

*from CRC Handbook of Chemistry and Physics, 71$^{st}$ ed., 1990

In the case of magnesium, as long as oxygen is available, overall reaction E will generate about 3 volts. Because this self-applied voltage is greater than the 1.877 volt standard potential for overall Reaction F, Reaction F will be forced in the reverse direction. At this point no hydrogen is present to react so there is no activity other than Reaction E. As long as the current draw on the cell is less than the current available from Reaction B (as part of overall Reaction E), a cell output near 3.1 volts generated by Reaction E. If the current draw approaches what is available from the maximum rate of oxygen influx by diffusion, the more rapid consumption of the diffused oxygen results in a lower concentration at the cathode, causing the output voltage to drop. When this voltage drops below 1.877 volts, Reaction F is no longer inhibited and can proceed in the forward direction to generate more current. The simultaneous occurrence of these two sets of spontaneous reactions generates hydrogen while consuming oxygen.

These reactions provide the ability to generate over three volts, a high value for electro-chemical reactions. The high reactivity of magnesium, reflected in its high oxidation potential, is the primary contributor to the overall cell voltage. In addition, magnesium hydroxide is sparingly soluble. Precipitation of it contributes an electrochemical potential $E^0$ that can be calculated from magnesium hydroxide's solubility product (CRC 1990), a quantity that characterizes the equilibrium concentrations in Reaction D. This precipitation reaction continually removes magnesium and hydroxide ions from the system, allowing the half-cell Reactions A, B, and C to continue without inhibition by their products. Based on densities and molecular weights (CRC 1990), reaction of one volume of magnesium metal will generate 1.76 volumes of precipitated magnesium hydroxide- or more if the precipitate forms as loosely packed crystals.

The actual voltage generated by an electrochemical cell can be different from the standard potential if the reactants or products are at conditions other than standard, 25° C. and one atmosphere pressure of each species. At the conditions of cell operation, only oxygen is not at or, for temperature, very near the standard conditions. Assuming air can freely diffuse to the cathode and ignoring the effect of altitude, the oxygen partial pressure in these reactions is only 0.21 atm. Supplying pure oxygen to the cell raises this value to 1.0 atm resulting in a corresponding increase in cell potential of about 0.02 V. The five-fold greater partial pressure of oxygen possible with pure oxygen versus air, leads to a five times greater rate of diffusion to the cathode, hence a maximum current output from this reaction that is five times greater than with air.

In order to optimize and control the progress of the half-cell reactions, this battery design invention applies systems and methods that control the transport of solutions and gases to the respective anode and cathode half-cells. The invention uniquely achieves uniform dispersion and contract with the anode or cathode, achieves a high charge dispersion, places the position electrical conduit post of both the cathode and anode sides in effective locations, and is based on robustness of materials for target fields of application, and for human and environmental protection from toxic, hazardous, corrosive, or flammable chemical and gases.

Several practical embodiments have been built and demonstrated using the fundamental fuel card stacks in various frameworks. For purposes of the applications, a few embodiments are discussed to illustrate the range of applications that can be commercialized.

Back-Up Power Supply.

In this embodiment, the framework is pre-loaded with fuel card stack assemblies that are held in reserve supply until power is needed. When the cells are hydrated, electricity production begins for the purpose of (a) extended heating or illumination, (b) a power source to charge electronic equipment under any condition, or (c) providing emergency power to hospitals or home medical equipment, information management data centers, air-traffic control stations, etc.

Remote Power Supply.

In this embodiment, the on-demand power supply may be used in space applications, deep-sea vehicles, or field applications where connectivity to the electrical grid is nonexistent, or where it is not desirable to deploy a fossil-fuel/electrical generator, or where it is not reliable to deploy a photo-voltaic or wind turbine. The power source may be for field uses where lightweight equipment is preferred. In some applications, the source of water to hydrate the cells may not need to be transported.

Example 1

Working Half-Cell

The working example that follows teaches by way of example and not by limitation.

A battery fuel card was constructed as shown in FIG. 1 including styrofoam as membrane 2 with small perforations 3 to allow ingress of external air with oxygen 1 to a cathode 5 made of crushed carbon while retaining the electrolyte solution 8. Copper mesh 4 provided electrical contact with the carbon layer and to be one terminal of the cell when connected to an external load. The electrolyte layer 7 was a fiber pad saturated with an electrolyte solution containing water and propylene glycol. The metal plate 9 was magnesium measuring 4×4×0.0625 inches, representing 28.5 grams, or 1.17 moles, of the metal. The graphene nanocoating 11 was not used in this example.

The cell was observed to produce up to 3.010 volts. High demand operations produced near 1.5 volts output. A layer of solids formed near the magnesium anode during operation. This layer presumably contained magnesium hydroxide confirming at least Reaction D. Bubbles formed on the magnesium anode during operation. Based on gas chromatography and their flammability, these bubbles were hydrogen.

Switching form air to pure oxygen as the oxygen source 1 boosted cell performance. Providing CO2 or N2 caused a reversible cessation of cell activity with zero volts output.

The cell became warm during operation, reaching up to 125° F. at high current draw. The electrolyte fluid would dry out and had to be replenished about every eight hours.

In the cell of this evaluation, it was unusual that a set of reactions consuming oxygen would also generate hydrogen rather than water or hydroxide ions. One possible explanation is that the oxygen-consuming reactions occur to only modest extent, limited by a low diffusion rate of oxygen through the small holes in the plastic foam pad. As long as oxygen is available, overall reaction E will generate about 3 volts. Because this self-applied voltage is greater than the 1.877 volt standard potential for overall reaction F, F is forced in the reverse direction. However, at this point no hydrogen is present to react so there is no activity other than reaction E. As long as the current draw on the cell is less than the current available from reaction B (as part of overall reaction E), a cell output near 3.1 volts would be generated by reaction E. However, if the current draw approaches what is available from the maximum rate of oxygen influx by diffusion, the more rapid consumption of the diffused oxygen results in a lower concentration at the cathode, causing the output voltage to drop. When it drops below 1.877 volts, reaction F is no longer inhibited and can proceed in the forward direction to generate more current. The simultaneous occurrence of these two sets of spontaneous reactions generates hydrogen while consuming oxygen.

These reactions also explain the ability to generate over three volts, a high value for electro-chemical reactions. The high reactivity of magnesium, reflected in its high oxidation potential, is the primary contributor to the overall cell voltage. In addition, magnesium hydroxide is sparingly soluble. Precipitation of it contributes an electrochemical potential E° that can be calculated from magnesium hydroxide's solubility product (CRC 1990), a quantity that characterizes the equilibrium concentrations in reaction D. This precipitation reaction continually removes magnesium and hydroxide ions from the system, allowing the half cell reactions A, B, and C to continue without inhibition by their products.

As expected from this, the formation of a solid at the magnesium anode was observed in these cells. Based on densities and molecular weights (CRC 1990), reaction of one volume of magnesium metal should generate 1.76 volumes of precipitated magnesium hydroxide or more if the precipitate forms as loosely packed crystals. The actual voltage generated by an electrochemical cell can be different from the standard potential if the reactants or products are at conditions other than standard, 25° C. and one atmosphere pressure of each species. At the conditions of cell operation, only oxygen was not at or, for temperature, very near the standard conditions. Assuming air can freely diffuse to the cathode and ignoring the effect of altitude, the oxygen partial pressure in these reactions is only 0.21 atm. Supplying pure oxygen to the cell raises this value to 1.0 atm but the corresponding increase in cell potential was small, only about 0.02 V. However, the roughly five-fold greater partial pressure of oxygen lead to a five times greater rate of diffusion to the cathode, hence a maximum current output from this reaction that is five times greater than with air.

Assuming 90% utilization of the anode material before failure, the half cell had a capacity of 57 ampere-hours. Thus, one cell could deliver one amp of current for well over two days. The cell also consumes water during this time. Assuming conservatively that 2 moles of water are needed per mole of magnesium reacted (net reaction F rather than E), the chemistry requires that 42 grams (1.5 ounces) of water be supplied during operation. This quantity does not include leakage or incidental evaporation into the atmosphere.

In use the cell generated a noticeable amount of heat. The amount of hear can vary greatly depending on how much energy is productively extracted as electricity rather than dissipated thermally including via ohmic heating. Even assuming operation at the maximum possible efficiency, the thermodynamics of the reactions require a nonzero heat generation. This minimum amount of heat release can be calculated from TΔS (absolute temperature times change in entropy for the reaction, CRC1990) which for reaction E is equivalent to 0.37 W of heat when producing one ampere of current. While this is not a large number compared to intentional heating devices, the cell is small (hence has a high heat generation per volume).

The cell commenced operation producing a modest voltage that rose over several minutes. There are two possible explanations for this observation. In the first, internal polarization of the cell results if ions accumulate at the anode and cathode where they are being formed. This charge accumulation opposes the voltage generated by the electrochemistry alone, leading to a lower output voltage measured at the cell's terminals. Reducing this accumulation by increasing the diffusion rate of those ions therefore leads to a higher output voltage; a higher cell temperature as a result of gradual self-heating will make this happen. The second possibility is that in a newly constructed cell the electrolyte solution contains only sodium and chloride ions. The hydroxide ion concentration is only that associated with water (104 moles/liter at pH 7). This low concentration requires that a relatively high concentration of magnesium ions be present before reaction D can form solids. That high concentration of magnesium ions reduces the potential generated by reaction A. However, as the cell operates hydroxide ions are formed at the cathode. As they accumulate there, the resulting concentration difference causes them to diffuse across the electrolyte-filled pad. Once these hydroxide ions reach the anode, they can precipitate the accumulated magnesium ions and raise the cell output voltage. The startup delay is a consequence of how long it takes for the electrochemically formed hydroxide ions to establish a concentration gradient and diffuse across the thickness of the electrolyte layer.

Example 2

Graphene Layer

In the use of cells like that shown in Example 1, it was observed that towards the end of life the metal layer 9 would sometimes break away at the post 10. Thus, for example, a large percentage of the metal, such as 40%, could remain at the end of life. Incorporation of graphene as nano-coating 11 solved this problem. Cells constructed in this manner do not suffer diminished performance and frequently consume 90% or more of the magnesium in metal plate 9.

Those skilled in the art will appreciate that what is shown and described the discussion above teaches by way of example and not by limitation. Persons of ordinary skill in the art will appreciate that insubstantial changes may be made to what is shown and described without departing from the spirit of the invention. Accordingly, the inventor states his intention to rely upon the Doctrine of Equivalents to protect his full rights in what is claimed as the invention.

I claim:

1. In a battery cell that contains a cathode, a metal anode, and an electrolyte material for conducting anodic and cathodic reactions when oxygen is introduced into the cell, the improvement comprising:
the electrolyte material consists of one or more materials classified as a glycol.

2. The battery cell of claim 1, the improvement further comprising a graphene coating on the metal anode.

3. The battery cell of claim 1, the improvement further comprising the metal anode selected from the group consisting of magnesium, zinc, aluminum and combinations of these metals.

4. The battery cell of claim 3, the improvement further comprising the one or more materials classified as a glycol including propylene glycol.

5. The battery cell of claim 1, the improvement further comprising the one or more materials classified as a glycol consisting of propylene glycol.

6. The battery cell of claim 1, the improvement further comprising the metal anode being constructed and arranged as a renewable fuel card.

7. The battery cell of claim 6, wherein the renewable fuel card is constructed and arranged for recharging the battery cell by replacing the fuel card.

8. The battery cell of claim 1, the improvement further comprising a plurality of the battery cells electrically coupled in an assembly configured to produce electrical power in a range from 100 kW-hr to 10 MW-hr.

9. The battery cell of claim 1, the improvement further comprising an absorbent pad interposed between the anode and the cathode for dispersion of the one or more materials classified as a glycol to facilitate the anodic and cathodic reactions.

10. The battery cell of claim 1, the improvement further comprising an oxygen source selected as a gas pump or pressurized canister configured to supply oxygen to facilitate the anodic and cathodic reactions.

11. The battery cell of claim 1, the improvement further comprising means for selective control of the reactions by removing the one or more materials classified as a glycol to stop the anodic and cathodic reactions.

12. A method for producing on-demand high performance direct current using a battery cell according to claim 1, comprising providing all elements of the battery cell except for the one or more materials classified as a glycol; and when electricity is required on-demand, adding the one or more materials classified as a glycol for generation of the electricity.

13. In a battery cell that contains a cathode, a metal anode, and an electrolyte material for conducting anodic and cathodic reactions when oxygen is introduced into the cell, the improvement comprising:
the electrolyte material consisting essentially of one or more materials classified as a glycol.

14. The battery cell of claim 13, the improvement further comprising a graphene coating on the metal anode.

15. The battery cell of claim 13, the improvement further comprising the metal anode selected from the group consisting of magnesium, zinc, aluminum and combinations of these metals.

16. The battery cell of claim 15, the improvement further comprising the one or more materials classified as a glycol consisting of propylene glycol.

17. The battery cell of claim 13, the improvement further comprising the one or more materials classified as a glycol consisting of propylene glycol.

18. The battery cell of claim 13, the improvement further comprising the metal anode being constructed and arranged as a renewable fuel card.

19. The battery cell of claim 18, wherein the renewable fuel card is constructed and arranged for recharging the battery cell by replacing the fuel card.

20. The battery cell of claim 13, the improvement further comprising a plurality of the battery cells electrically coupled in an assembly configured to produce electrical power in a range from 100 kW-hr to 10 MW-hr.

21. The battery cell of claim 13, the improvement further comprising an absorbent pad interposed between the anode and the cathode for dispersion of the one or more materials classified as a glycol to facilitate the anodic and cathodic reactions.

22. The battery cell of claim 13, the improvement further comprising an oxygen source selected as a gas pump or pressurized canister configured to supply oxygen to facilitate the anodic and cathodic reactions.

23. The battery cell of claim 13, the improvement further comprising means for selective control of the reactions by removing the one or more materials classified as a glycol to stop the anodic and cathodic reactions.

24. A method for producing on-demand high performance direct current using a battery cell according to claim 13, comprising providing all elements of the battery cell except for the one or more materials classified as a glycol; and when electricity is required on-demand, adding the one or more materials classified as a glycol for generation of the electricity.

* * * * *